United States Patent [19]

Hoover et al.

[11] Patent Number: 4,818,413
[45] Date of Patent: Apr. 4, 1989

[54] BIOCIDE WATER TREATMENT HAVING REDUCED COPPER CORROSION

[75] Inventors: Richard L. Hoover, St. Charles, Ill.; Mark A. Bush, Louisville, Ky.

[73] Assignee: Nalco Chemical Company, Naperville, Ill.

[21] Appl. No.: 81,857

[22] Filed: Aug. 5, 1987

[51] Int. Cl.$^4$ ................................................. C02F 1/76
[52] U.S. Cl. .................................... 210/739; 210/754; 210/764; 162/161; 422/14; 422/37
[58] Field of Search ................ 210/739, 753, 754, 764, 210/96.1, 746; 162/161; 422/14, 37

[56] References Cited

U.S. PATENT DOCUMENTS

| | | | |
|---|---|---|---|
| 2,443,429 | 6/1948 | Marks et al. | 210/753 |
| 2,580,809 | 1/1952 | Marks et al. | 210/753 |
| 3,592,212 | 7/1971 | Schleimer et al. | 210/746 |
| 4,451,376 | 5/1984 | Sharp | 210/754 |
| 4,631,530 | 12/1986 | Gasper | 210/739 |
| 4,643,835 | 2/1987 | Koeplin-Gall et al. | 210/754 |
| 4,659,459 | 4/1987 | O'Leary et al. | 210/96.1 |

FOREIGN PATENT DOCUMENTS 2225030 12/1972 Fed. Rep. of Germany ........ 422/14

OTHER PUBLICATIONS

"Cooling Water Chlorination," TF-132, Nalco Chemical Company (1986) (4 pp.).
James & Slifer, "Cooling Water Treatment Using a Liquified Gas Feeder and Bromine Chloride," 46th Annual Meeting International Water Conference Pittsburgh, PA (Nov. 4-7, 1985).
Kraemer et al., "Chlorine Minimization With a Chlorine-Bromine-Biodispersant Mixture," American Power Conference, Chicago, IL (Apr. 23-25, 1984).
"N-Compas (Trademark) (Innovative Computerized Service) Programs for Electric Utilities," Nalco Chemical Company (1983) (4 pp.).
Federal Register, vol. 47, No. 224, Friday, Nov. 19, 1982, pp. 52304-52309.
"Chlorine Alternatives for Steam Electric Plants," PR-3, Nalco Chemical Company, (1982) (1 page).
"Chlorine Alternatives," UT-1, Nalco Chemical Company (1982).

Primary Examiner—Peter Hruskoci
Attorney, Agent, or Firm—Richard C. Auchterlonie

[57] ABSTRACT

The copper corrosion rate is minimized to a certain discharge limit by providing a chlorine-bromide treatment in which the chemical feed rate of bromide is increased to an amount required to decrease the copper corrosion rate to the rate required to meet the discharge limit. The inventors made the unexpected and surprising discovery that an increase in the chemical feed rate of bromide—even when the chlorine feed rate is constant—has the effect of reducing copper corrosion. Therefore, this effect is useful for adjusting the copper corrosion rate to an optimum rate to most economically achieve a certain discharge limit. In a preferred embodiment of the invention, the biocide water treatment program includes the steps of measuring the copper corrosion rate during a chlorine-bromide treatment interval, computing the value of copper discharge from the measured copper corrosion rate, comparing the computed value of copper discharge to the discharge limit, and adjusting the bromide chemical feed rate based on the comparison, to thereby economically achieve an amount of copper discharge within the discharge limit.

6 Claims, 10 Drawing Sheets

BIOCIDE WATER TREATMENT HAVING REDUCED COPPER CORROSION

BACKGROUND OF THE INVENTION

1. Field of the Invention

The present invention generally relates to the treatment of industrial process water to control the growth and deposit of microorganisms, and more particularly to the treatment of industrial process water with a chlorine containing oxidant and a bromide salt in such a way that copper corrosion is reduced to a certain minimal level.

2. Description of the Related Art

Many industrial process waters are contaminated with microorganisms, particularly bacteria. Industrial process waters are used in the cooling towers and condensers of electrical power plants, and in many manufacturing plants such as paper mills.

Fouling caused by microorganisms in the cooling systems of power plants is an especially troublesome problem. The temperatures inside a typical condenser provide an ideal environment for the growth of microorganisms. Even a few thousandths of an inch of slime deposit on a condenser tube has been shown to affect condenser efficiency, plant heat rate and maintenance costs. The slime layer forms a sticky substance which allows silt and other particles to adhere to the surface of the condenser tube. The heat transfer loss due to this insulating layer has been estimated to cost the electric utility industry up to $400 million a year in additional fuel costs. Moreover, corrosion and pitting can occur under the slime and silt deposits, causing long term damage to the cooling system.

The least expensive method of controlling biofouling is to treat the process water by chlorination with either gaseous chlorine or liquid sodium hypochlorite. But chlorination practices have been strictly regulated by the Environmental Protection Agency ("EPA") due to toxic byproducts which are believed to form. This has required the electric utility industry to accept chlorine minimization and alternatives to chlorine to meet the strict chlorine discharge limits while maintaining adequate plant performance. The chlorine discharge limits are specified by a certain minimum value of the "total residual chlorine" (TRC). A typical minimum value of TRC is 0.2 mg/l.

There are a number of biocide alternatives to chlorination which are capable of reducing the TRC value to 0.2 mg/l. These alternatives include water treatment with sodium sulfite, sulfur dioxide, chlorine dioxide, and bromine. But in the amounts required for comparable biocide activity, sodium sulfite, sulfur dioxide, and chlorine dioxide are far more expensive than chlorine. Bromine is also more expensive than chlorine, but its biocide activity is greater. Consequently, bromine is one of the most cost-effective biocide alternatives to chlorination.

The increased biocide activity of bromine is not due to the elemental bromine itself, since it is well known that chlorine is a much stronger oxidant than bromine. For both chlorine and bromine, the biocide activity is primarily due to their respective reaction products with water, which are hypochlorous acid and hypobromous acid. Bromine and chlorine are also compatible biocides, and can be used simultaneously in various amounts.

Elemental bromine, which is a liquid, can be injected directly into the process water stream to provide biocide treatment. For use with chlorine, both the chlorine and the bromine in the form of fuming bromine chloride liquid can be injected simultaneously into the process water stream. But fuming bromine chloride is relatively dangerous to handle.

A safe and economical method of providing hypobromous and hypochlorous acid in process water is to chlorinate the process water in the usual fashion, and to simultaneously inject a bromide salt. The hypochlorous acid produced during chlorination reacts with the bromide ions in solution to form hypobromous acid and chloride ions. In order to achieve a good conversion rate with this reaction, the reactants should be relatively concentrated, and therefore the hypobromous acid (or hypobromite) is produced as a treating solution which is injected into the process water stream. Due to the fact that hypochlorous acid is consumed in the reaction, the chlorine residual to bromide ratio can be varied to obtain a system which contains anywhere from a total bromine residual to a total chlorine residual. This is particularly important in systems with high ammonia levels since bromamines degrade more rapidly, and consequently, are not as persistent in the environment.

The preferred method of biocide treatment of process water with a bromide salt and a chlorine containing oxidant is further described in Sharp U.S. Pat. No. 4,451,376, herein incorporated by reference. In accordance with a typical chlorination process, a solution is prepared including a chlorine containing oxidant chosen from the group consisting of an inorganic hypochlorite salt, hypochlorous acid, and chlorine. Also a solution is prepared containing a water-soluble inorganic bromide such as sodium bromide, and an anionic polymeric dispersant such as low molecular weight copolymers of acrylic acid or methyl or ethyl acetate. These two solutions are mixed to form a treating solution according to the conversion reaction described above. The treating solution is then injected into the process water stream.

To convert a chlorination system to the preferred bromine system, a metering and pumping system for low viscosity fluids is provided to inject the sodium bromide and dispersant solution into the chlorination system. The preferred point of injection is either before or after the chlorination injection so that the sodium bromide and the chlorine containing oxidant are mixed together in a relatively high concentration aqueous solution. A brand of sodium bromide and dispersant mixture is sold commercially under the trademark "Acti-Brom" by Nalco Chemical Company, One Nalco Center, Naperville, Ill., 60566-1024. As a starting dosage, it is recommended that the chlorine dosage be reduced by 50 to 75%. Then for every ppm of $Cl_2$ being fed at this reduced rate, 0.85 ppm of sodium bromide should be fed. In addition, the chlorination time should be reduced by 50%; since the hypobromous acid is a very active biocide, even further reductions in chlorination may be possible.

Laboratory and field testing of activated bromide chlorine mixtures for biofouling control in power plant cooling systems is described in F. Kramer et al., "Chlorine Minimization With A Chlorine-Bromine-Biodispersant Mixture," presented at the American Power Conference, 46th Annual Meeting, Apr. 23–25, 1984, Chicago, Ill., herein incorporated by reference. Toledo Edison had investigated several methods of biofouling control and found that the most effective method was an activated bromide chloride mixture. One of the concerns was whether the activated bromide-chlorine mixture was more corrosive than chlorine alone. Laboratory studies, however, indicated that corrosion rates for the activated bromide mixtures were similar to chlorine alone, but overall corrosion rates should be less due to the shorter treatment time. Specifically, mild steel, admiralty, and 304 stainless steel cupons were exposed to a chlorine and activated bromine-chlorine residual of 2 times and 1000 times the normal expected value. The data were taken for a 24 hour period. For activated bromine-chlorine, the respective corrosion rates at 2 times normal residual were 4.7 mpy (mills-per-year), 0.2 mpy, and 0.1 mpy; for chlorine alone, the corresponding rates were 5.1 mpy, 0.2 mpy, and 0.0 mpy. It was concluded that if the treatment dosage remains below 2 times the normal value for only 1 hour per day, there should be no substantial corrosions of any of these metallurgies.

Typically the treatment time to prevent biofouling in power plant cooling systems is about two hours per day. The chemical feed rates, for example, are 2400 pounds per day of chlorine, and 170 pounds per day of sodium bromide.

In order to optimize a biocide water treatment program for a particular plant, Nalco Chemical Company has developed and used a mobile laboratory including monitoring equipment for measuring critical water cooling variables (such as pH, conductivity, fouling factors, and corrosion rates) and a computer programmed for data acquisition and correlation of changes in water chemistry or other variables to fouling and corrosion problems. The computer program includes a model of the operation of a cooling water system which considers the concentrating effect of the cooling tower and possible ranges of pH and temperature. The model predicts the solubility of up to 150 different minerals including calcium, chloride, copper fluoride, iron, magnesium, sodium, ammonia, nitrate, phosphate, sulfide, silicate, sulfate, and zinc.

Corrosion rates are important for monitoring the depreciation of the condensers. So that corrosion will not substantially reduce the expected lifetime of the cooling system, it is desirable to limit the corrosion rate to less than 0.1 mill per year.

In recent years it has become desirable to reduce corrosion due to a belief on the part of the EPA that corrosion products are toxic. For good heat transfer, mechanical strength and corrosion resistance, cooling systems are typically made of copper nickel alloy, such as 70/30 copper-nickel. In many locations, the EPA has set limits on the discharge of copper, which results from corrosion of the copper-nickel alloy. These limits vary from one locality to another, and sometimes they place more stringent limits on the corrosion rate than the limits dictated by the limits of residual chlorine and the economics of plant operation.

SUMMARY OF THE INVENTION

Accordingly, the primary object of the invention is to provide an economical biocide water treatment program for reducing copper corrosion to a certain discharge limit.

Briefly, in accordance with the invention, the copper corrosion rate is minimized to a certain discharge limit by providing a chlorine-bromide treatment in which the chemical feed rate of bromide is increased to an amount required to decrease the copper corrosion rate to the rate required to meet the discharge limit. The inventors made the unexpected and surprising discovery that an increase in the chemical feed rate of bromide—even when the chlorine feed rate is constant—has the effect of reducing copper corrosion. Therefore, this effect is useful for adjusting the copper corrosion rate to an optimum rate to most economically achieve a certain discharge limit. In a preferred embodiment of the invention, the biocide water treatment program includes the steps of measuring the copper corrosion rate during a chlorine-bromide treatment interval, computing the value of copper discharge from the measured copper corrosion rate, comparing the computed value of copper discharge to the discharge limit, and adjusting the bromide chemical feed rate based on the comparison, to thereby economically achieve an amount of copper discharge within the discharge limit.

BRIEF DESCRIPTION OF THE DRAWINGS

Other objects and advantages of the invention will become apparent upon reading the following detailed description and upon reference to the drawings in which.

Figure 1:
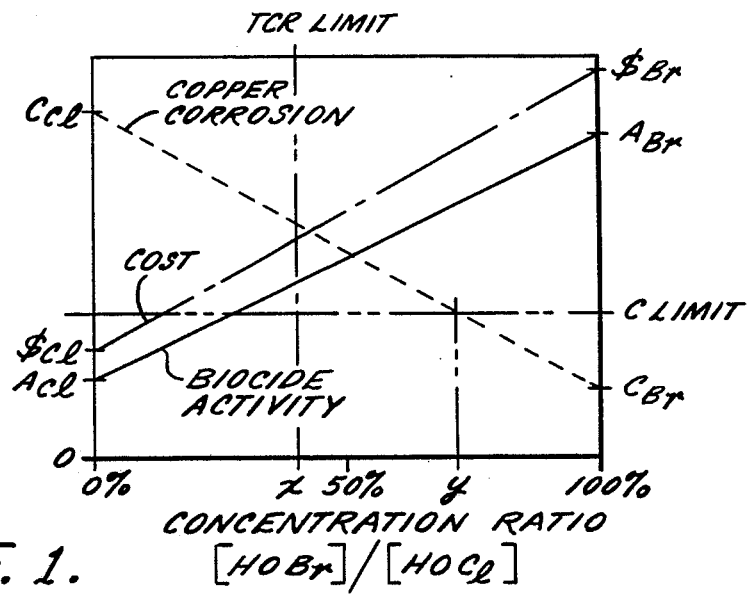
FIG. 1 is a graph of the relative copper corrosion rate, the cost, and the biocide activity of a chlorine-bromide biocide as a function of the ratio of the concentration of hypobromous acid to hypochlorous acid.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

The present invention stems from an unexpected and surprising discovery that the injection of bromide into a chlorination system for treating cooling water to an electric power plant has the effect of substantially decreasing copper corrosion. This was discovered and confirmed by the inventors while they were employed for Nalco Chemical Company and were using the Nalco mobile laboratory to monitor the cooling system of the Miami Fort station of the Cincinnati Gas and Electric Company from July 11, 1986 (FIG. 3) to Aug. 5, 1986. The test results, which are illustrated by the graphs in FIGS. 3–11, show the copper corrosion in mills per year in the upper curves and show the residual chlorine in parts per million in the lower curves. The corrosion was measured with an instrument called a corrator, manufactured by Magna Corp., which is a kind of corrosometer which determined corrosion by measuring an electric current between electrodes made of the same copper/nickel alloy as the cooling system under test.

The correlation between the bromide feed rate and the corrosion rate first appeared in the test data of July 11, 1986 when a pump for feeding the bromide solution failed and shut off the bromide supply during biocide treatment with chlorine and the bromide solution. Specifically, the Nalco Chemical Corp. brand "Acti-Brom" (Trademark) bromide and dispersant was used. On July 18, 1986, the bromide solution was fed during the entire chlorination cycle which resulted in relatively low copper corrosion having a maximum of about 0.55 mills per year. On July 21, 1986, no bromide was fed during the chlorination cycle, and the corrosion rate reached a maximum of 1.93 mills per year. The following day, on July 22, 1986 (FIG. 6), the chlorine-bromide-biodispersant mixture was fed from 10:30 until 12:30. During this time period, the total residual chlorine reached a maximum of 0.43 parts per million. The corrosion rate reached a maximum of 0.93 mills per year during this time period. When the chlorine-bromide-biodispersant mixture was intentionally turned off at about 10:24, the chlorine continued flowing into the cooling system, and the corrosion rate jumped dramatically from 0.93 mills per year to 1.67 mills per year. The total residual chlorine also increased when only chlorine was injected even though the chlorine feed rate was not increased when the injection of the bromide-biodispersant mixture was shut off. Similar effects are shown in the other test data included in the appendix to the present specification.

Turning now to FIG. 1, there is shown a graph of how various factors are affected by the ratio of the concentration of hypobromous acid to hypochlorous acid during biocide treatment with a chlorine-bromide solution. If chlorine only is injected into the flow of process water, then only hypochlorous acid results so that the concentration ratio is 0%. If an equal molar amount of chlorine and bromide are injected into the process water, then virtually all of the bromide is converted to hypobromous acid and the chlorine becomes converted to chloride. The amount of residual chlorine can be decreased further by injecting an excess of bromide over chlorine, so that, in accordance with Le Chatelier's principle, the conversion reaction between hypochlorous acid and bromide is driven even further toward hypobromous acid production.

As shown in FIG. 1, the biocide activity increases as the concentration ratio reaches 100% hypobromous acid. However, the cost of producing hypobromous acid increases at an even faster rate, so that absent any factors other than cost and biocide activity, chlorine alone would always be used for biocide water treatment. EPA regulations on the total residual chlorine, however, set a TCR limit and to meet this limit bromide must be added to reduce the residual chlorine. As shown in FIG. 1, the TCR limit results in an optimum concentration ratio of x.

In accordance with the present invention, the biocide treatment process is modified so that the feed rate of bromide is increased to achieve a certain copper corrosion limit. This copper corrosion limit is dictated by the permissible copper discharge limit divided by the duration of the biocide treatment interval. The inventors made the unexpected and surprising discovery that the copper corrosion decreases as bromide is injected, even though the rate of chlorine injection remains constant. To achieve a certain copper corrosion limit $C_{limit}$, an even higher concentration ratio of hypobromous acid is needed. This higher concentration ratio y is obtained by increasing the chemical feed rate of the bromide solution relative to the chlorine feed rate.

Figure 2:
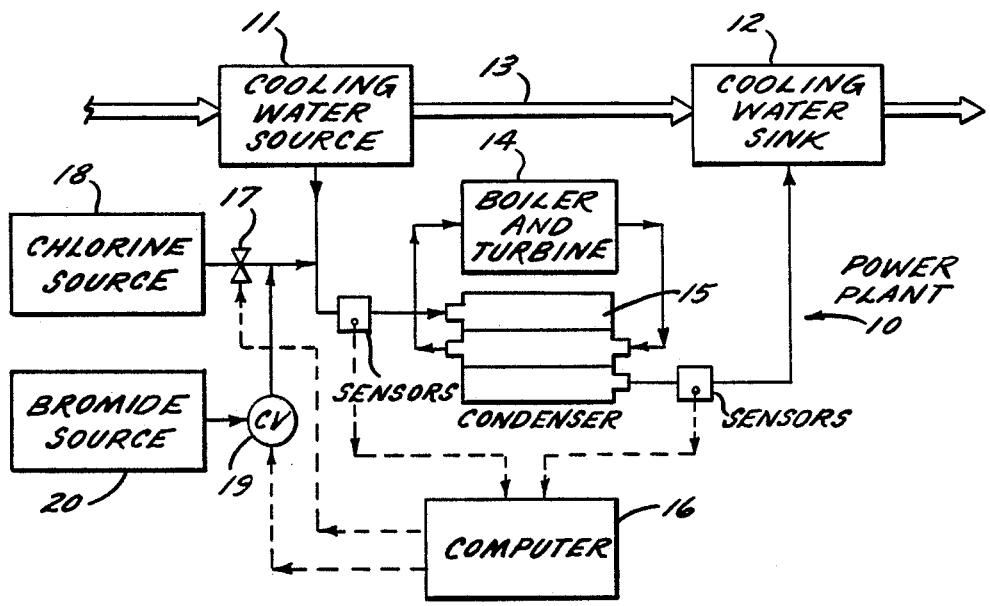
FIG. 2 is schematic diagram of a biocide water treatment process which employs the present invention.
Figure 3:
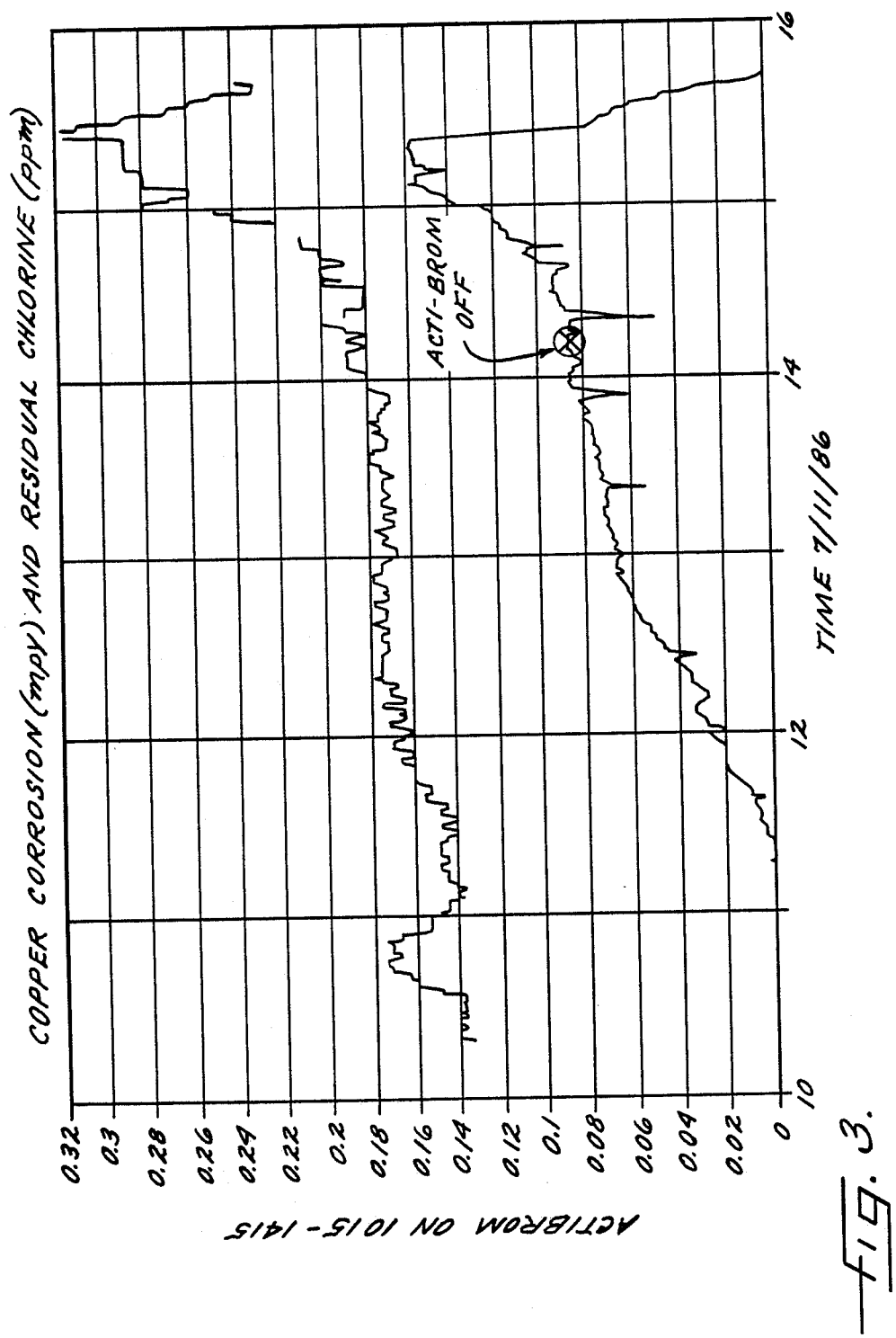
FIGS. 3–11 are graphs showing copper corrosion and residual chlorine levels in the cooling system of a commercial power plant.
Figure 4:
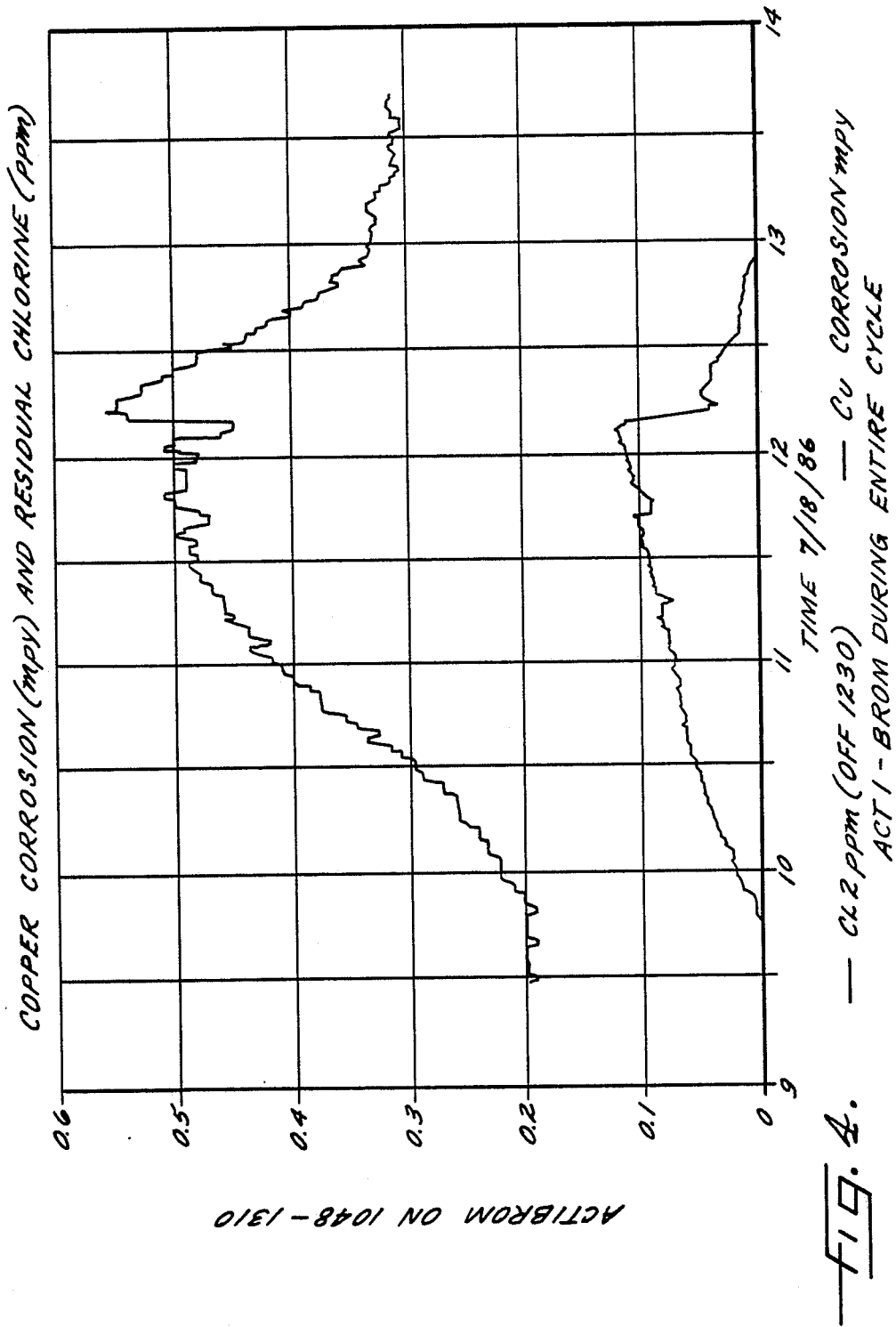
Figure 5:
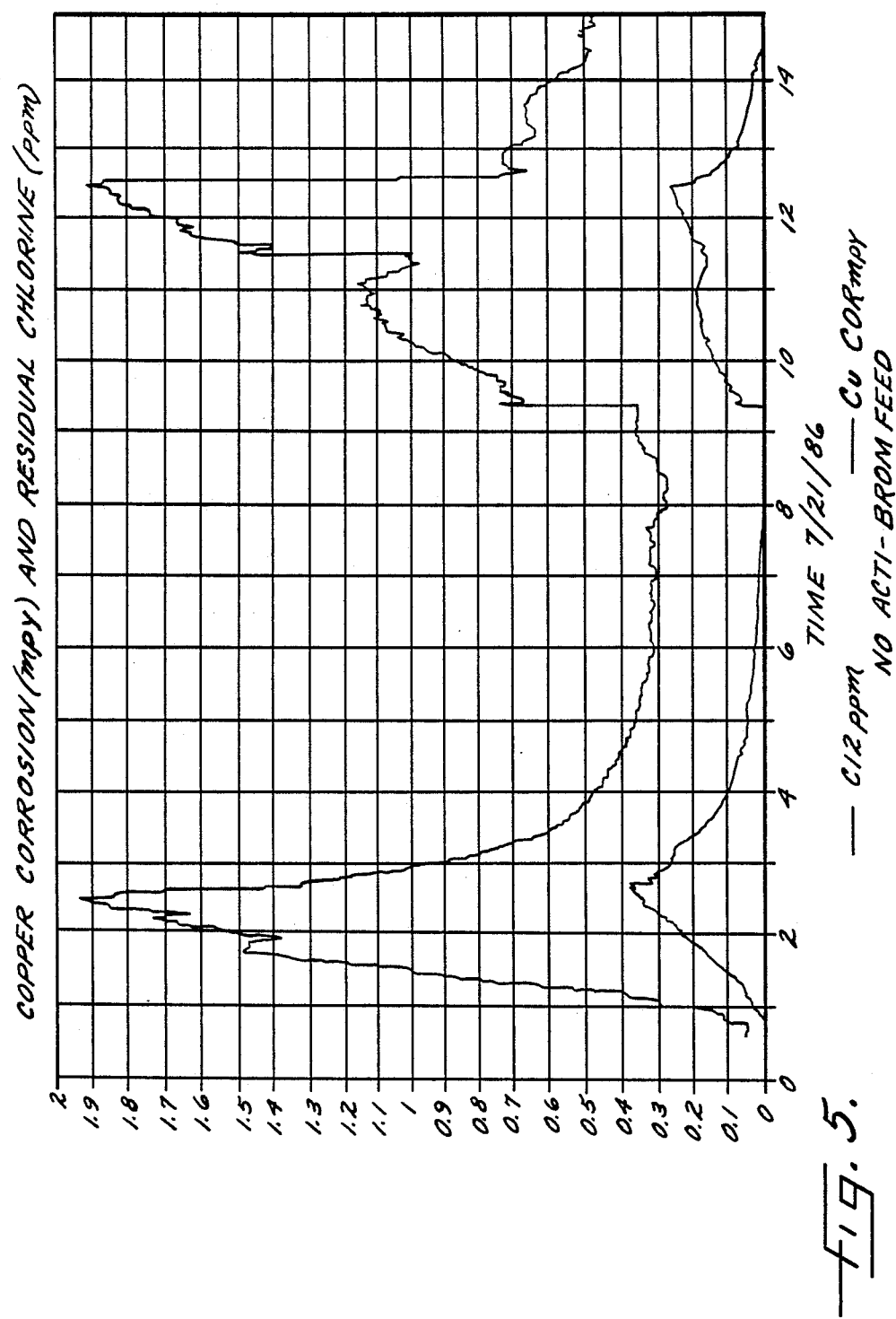
Figure 6:
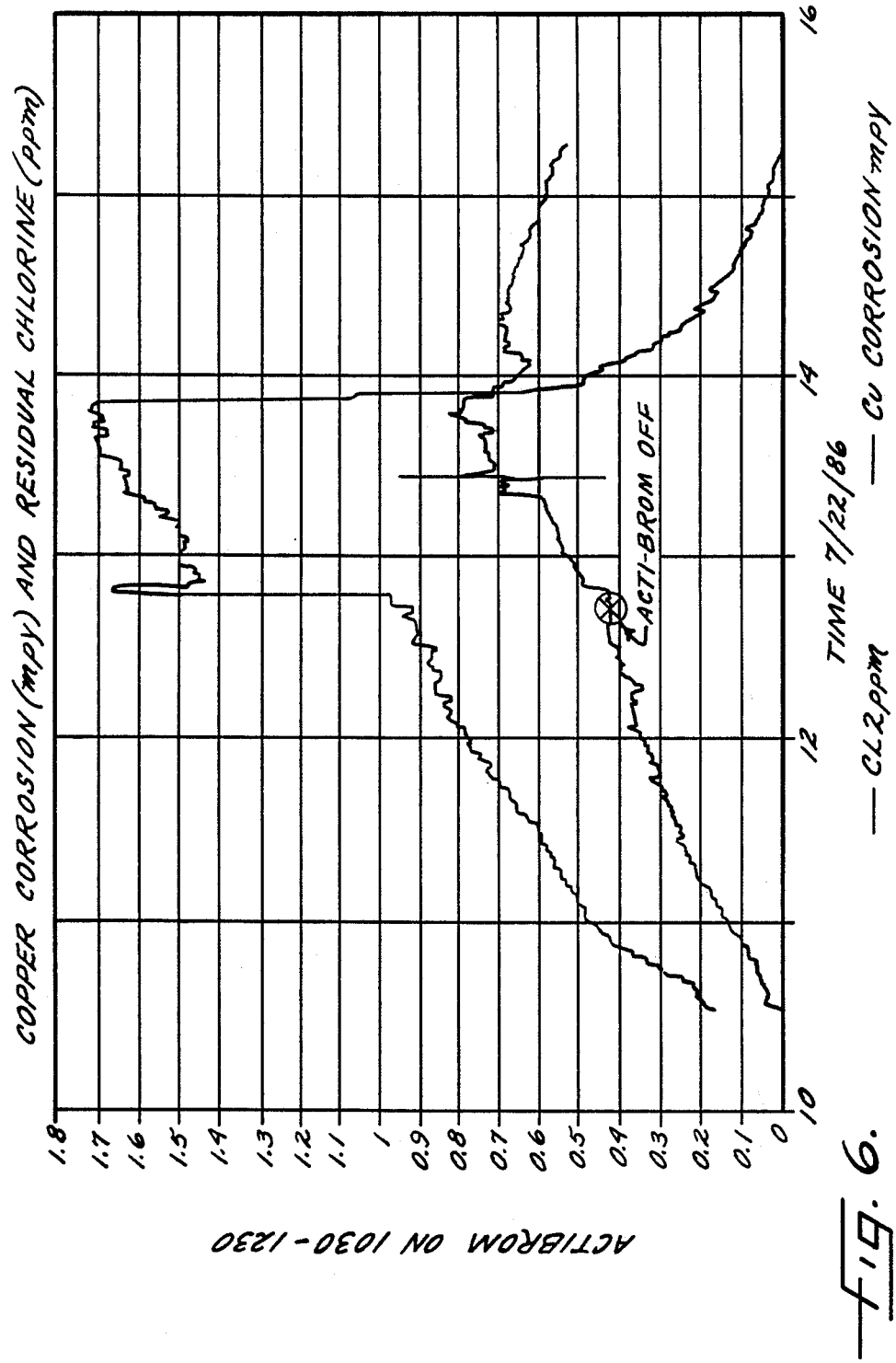
Figure 7:
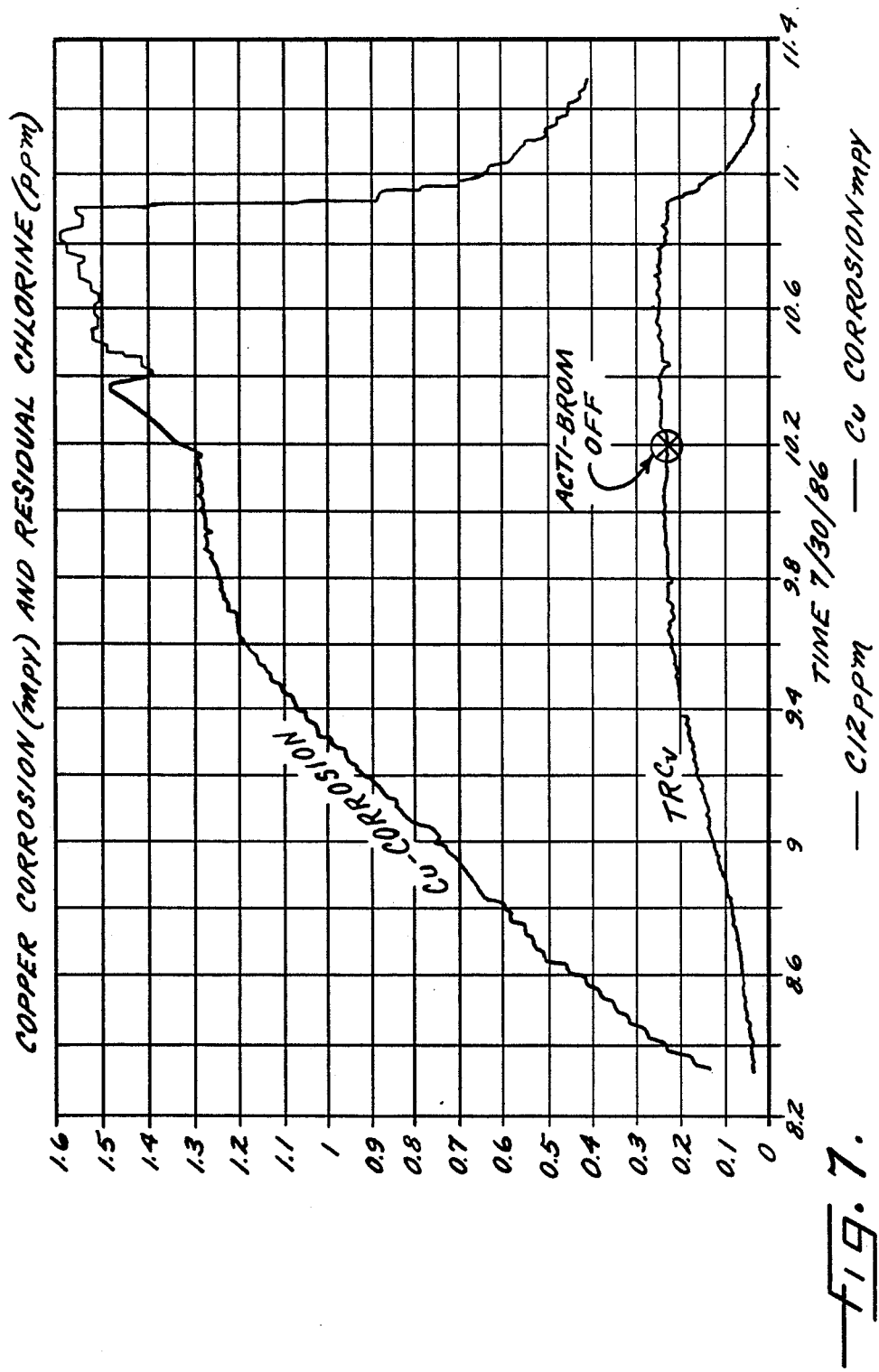
Figure 8:
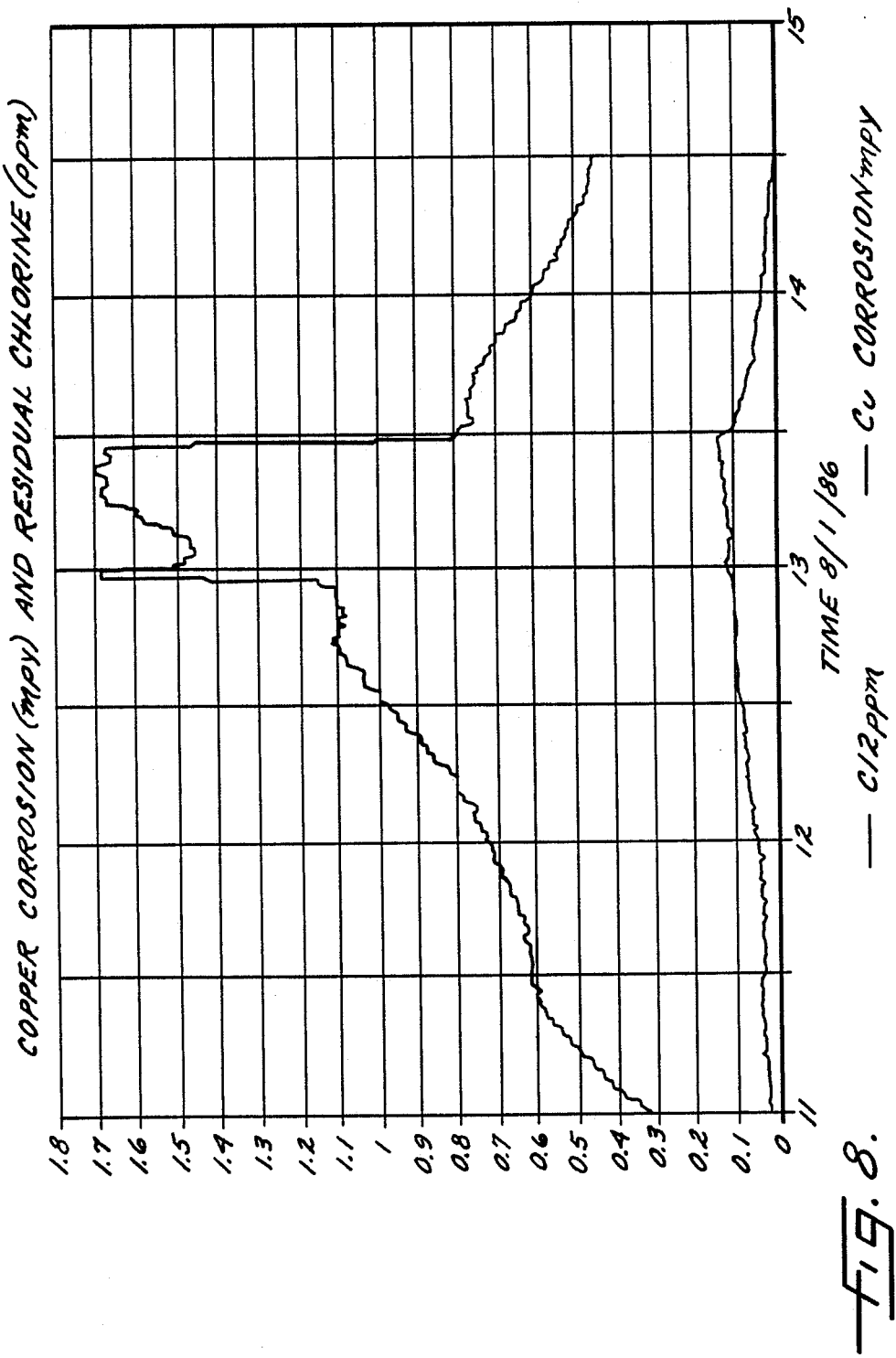
Figure 9:
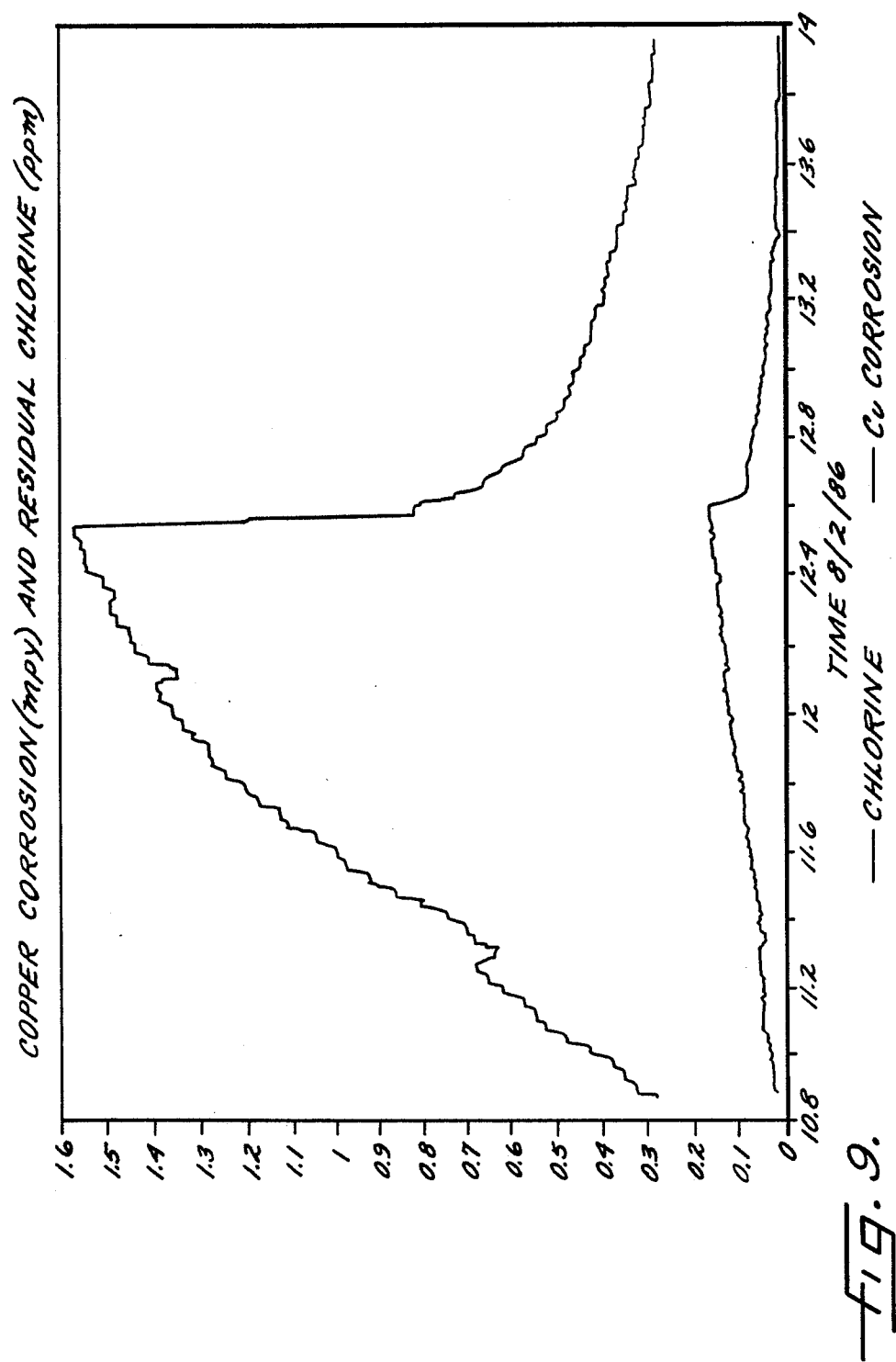
Figure 10:
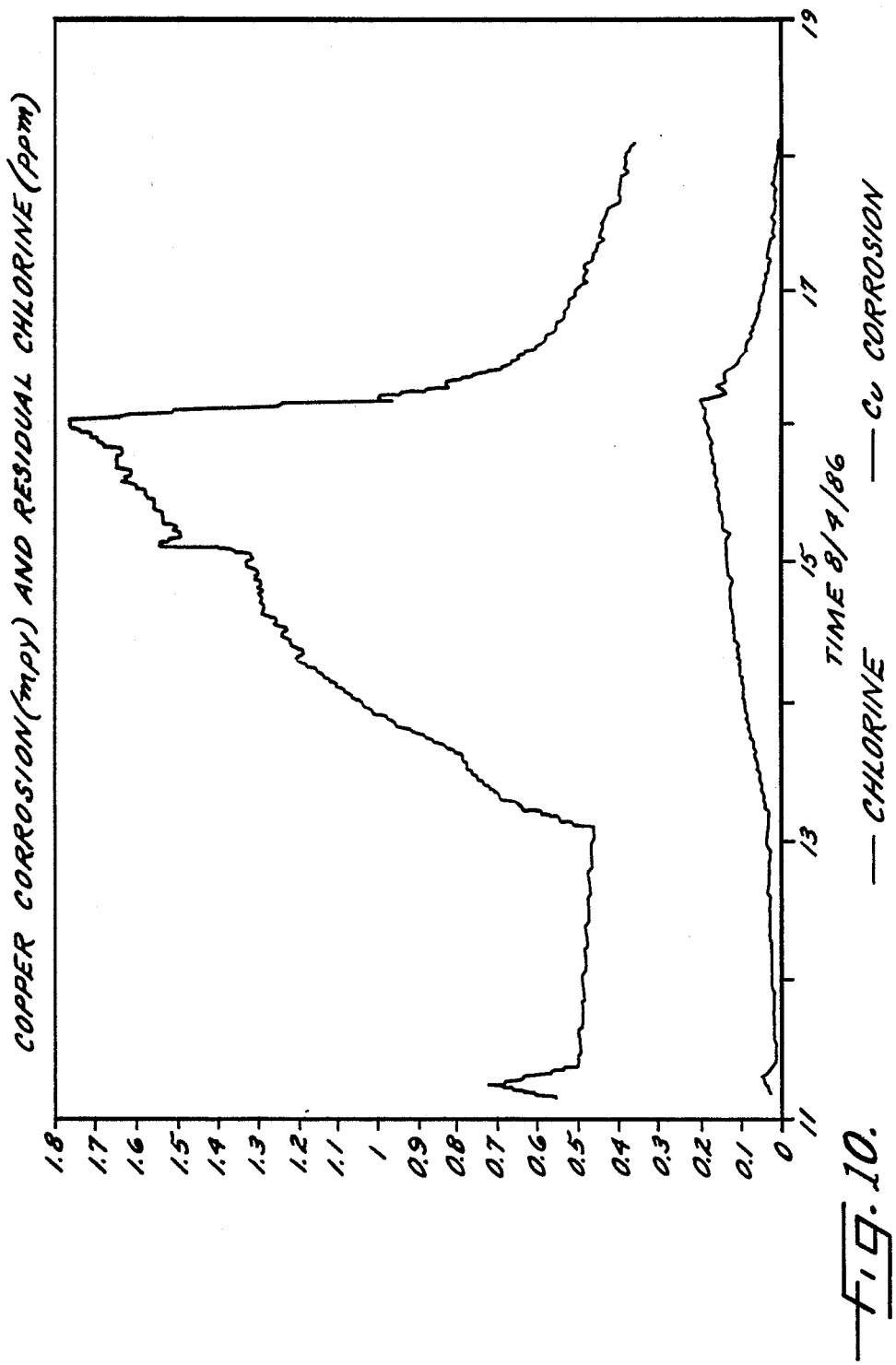
Figure 11:
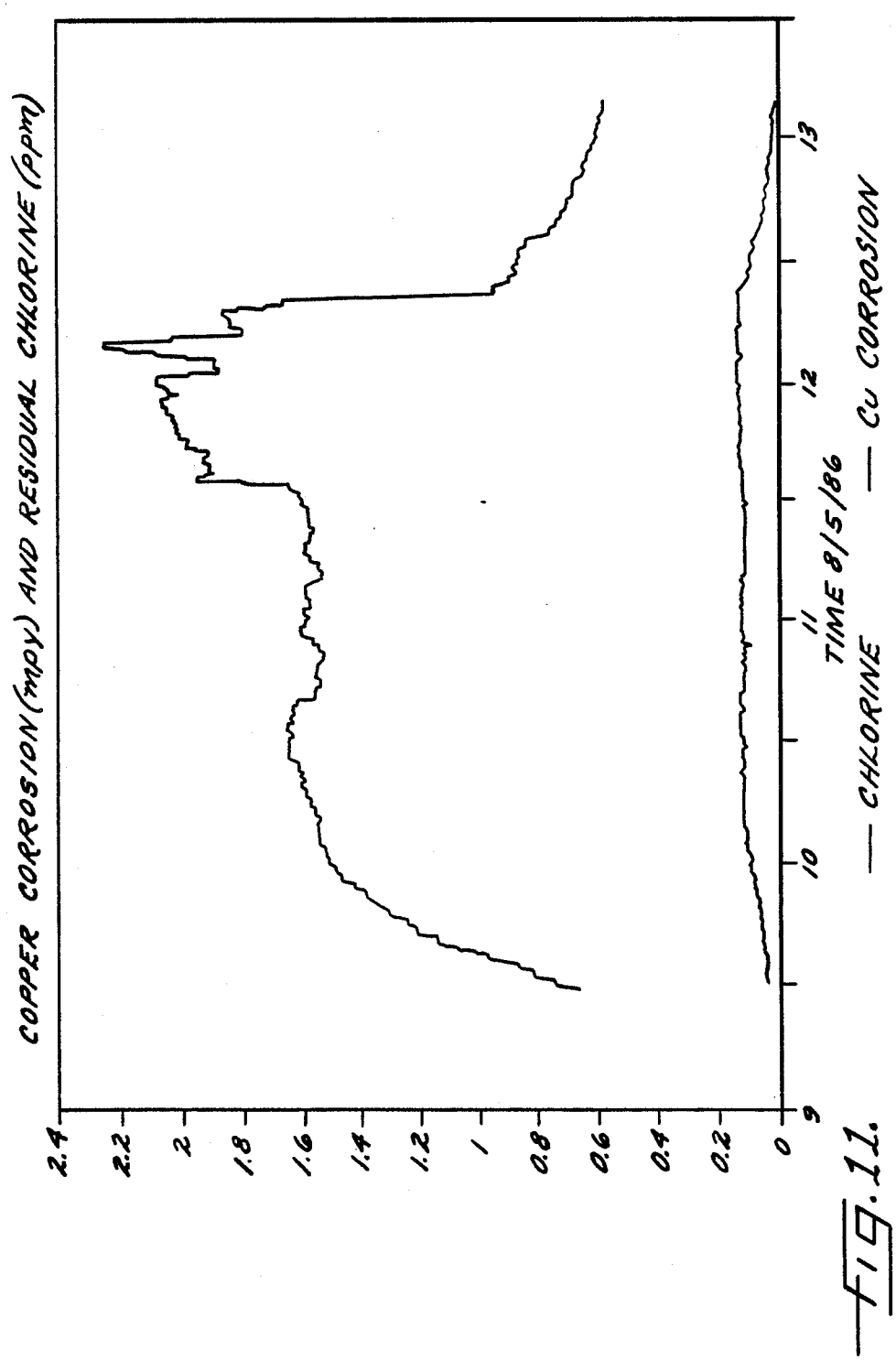

Turning now to FIG. 2, there is shown a schematic diagram of how the present invention can be used for optimizing the water treatment process of a power plant generally designated 10 which obtains cooling water from a source 11 and rejects the heated water to a sink 12. The source 11 and sink 12, for example, are respective inlets and outlets to a river 13. As is conventional, the power plant includes a boiler and turbine 14 which rejects heat to a condenser 15 which receives the flow of water from the source 11 to the sink 12.

In order to provide biocide treatment to the cooling water, a computer 16 periodically activates a valve or pump 17 to provide a regulated flow of chlorine from a chlorine source 18 into the flow of cooling water from the source 11 to the condenser 15. The chlorine source, for example, includes a supply of gaseous chlorine or sodium hypochloride. In order to provide increased biocide activity and a reduced residual chlorine limit, the computer 16 also activates a control valve or variable rate pump 19 in order to add a bromide and biodispersant solution from a source 20 to the flow of chlorine before the chlorine is injected into the flow of cooling water.

In accordance with the present invention, the chemical feed rate of bromide from the bromide source 20 is increased or adjusted to obtain a certain copper corrosion limit. Specifically, the power plant 10 is one of a number of pollution sources along the river 13. Due to this fact, the EPA sets a certain limit on the discharge of copper that is permitted from the power plant. In order to most economically meet this discharge limit, the computer 16 is provided with at least one sensor in order to sense the rate of discharge of copper into the cooling water into the river 13. This sensor, for example, is a corrosometer which indicates the rate of corrosion in the condenser 15. From this rate the amount of copper discharge can be obtained by multiplying the corrosion rate by the internal surface area of the condenser 15, and by the time duration of the chlorine-bromide treatment. Alternatively, a corrosometer reading could be calibrated against the actual discharge of copper from the power plant 10 by obtaining sufficiently large samples of water flowing from the source 11 and also into the sink 12 and measuring the copper concentration in those samples by applying standard chemical techniques of quantitative analysis.

Once the computer 16 senses the actual copper discharge rate, it, for example, determines the average discharge for an entire day's cycle and compares that discharge to the daily limit set by the EPA. Based on this comparison, the set point for the chemical feed rate of bromide is increased or decreased so that during the next day's water treatment cycle the discharge of copper will more closely approximate and will fall within the limit set by the EPA.

In view of the above, there has been described an improved an economical biocide water treatment process which achieves a certain copper corrosion limit by regulating the chemical feed rate of bromide relative to a feed of chlorine into the flow of processed water. Therefore, stringent limits on the discharge of copper into the environment can be met at minimum cost.

What is claimed is:

1. A method for treating industrial process waters flowing through a system made of copper or copper alloy to control the growth and deposit of microorganisms in said system by adding to said waters a combined amount of a bromide salt and a chlorine source which is effective to control said growth and deposit of said microorganisms, said bromide salt being added to said industrial process waters at an adjusted bromide feed rate, wherein the improvement comprises the steps of:

sensing the rate of copper corrosion in said system;

comparing the sensed rate of copper corrosion in said system to a predetermined corrosion limit which is less than said sensed rate of copper corrosion; and based on said comparing, increasing said bromide feed rate to decrease said copper corrosion rate to said predetermined corrosion limit, whereby the amount of copper discharge from said system into said industrial process waters is reduced.

2. The method as claimed in claim 1, wherein said chlorine source is added to said industrial process waters at a chlorine source feed rate which is held constant.

3. The method as claimed in claim 1, wherein the improvement further comprises repeating said sensing step a plurality of times, and after each repeated sensing step, comparing the sensed rate of copper corrosion in said system to said predetermined corrosion limit, and decreasing said bromide feed rate when the sensed rate of copper corrosion is less than said predetermined corrosion limit, and increasing said bromide feed rate when the sensed rate of copper corrosion is greater than said predetermined corrosion limit.

4. A method for treating industrial process waters flowing through a system made of copper or copper alloy to control the growth and deposit of microorganisms in said system by adding to said waters a combined amount of a bromide salt and a chlorine source which is effective to control said growth and deposit of said microorganisms, said bromide salt being added to said industrial process waters at an adjusted bromide feed rate, wherein the improvement comprises the steps of:

sensing the amount of copper discharge from said copper or copper alloy into said industrial process waters;

comparing a predetermined copper discharge limit to the sensed amount of copper discharge from said copper or copper alloy into said industrial process waters, said predetermined copper discharge limit being less than said sensed amount of copper discharge; and based on said comparing, increasing said bromide feed rate to decrease said amount of copper discharge to said predetermined copper discharge limit, whereby the amount of copper discharge from said system into said industrial process waters is reduced.

5. The method as claimed in claim 4, wherein said chlorine source is added to said industrial process waters at a chlorine source feed rate which is held constant.

6. The method as claimed in claim 4, wherein said step of sensing the amount of copper discharge includes the steps of sensing the rate of copper discharge from said copper or copper alloy into said industrial process waters, and computing said sensed amount of copper discharge based on the sensed rate of copper discharge from said copper or copper alloy into said industrial process waters.

* * * * *